June 7, 1938.   G. SCHILDGEN ET AL   2,120,154
AXIAL THRUST BALL BEARING
Filed Feb. 13, 1937

Inventors
Georg Schildgen
Georg Wehr
by Guido M Saundote
Attorney

Patented June 7, 1938

2,120,154

UNITED STATES PATENT OFFICE 2,120,154

AXIAL THRUST BALL BEARING

Georg Schildgen and Georg Wehr, Schweinfurt, Germany

Application February 13, 1937, Serial No. 125,605
In Germany February 13, 1936

6 Claims. (Cl. 308—201)

This invention relates to axial thrust ball bearings and more especially concerns sheet metal cages for such types of ball bearings of this character in which the balls are supported by deep grooves in the raceways so that the bearings are suitable to resist radial loads as well.

In bearings of this character the one-part ball cages of the usual type applied for guiding and keeping apart the balls in suitable distance in the raceways are unsuitable because their height in the direction of the axis of the bearing is too great so that they would get into touch with the raceways. In consideration of this, in bearings of this character cages have been applied which were built up from a plurality of parts. As these multipart cages are in many instances too expensive, it was frequently necessary to waive the application of cages for bearings of this kind altogether.

This invention now shows an arrangement whereby ball bearings of the above described character, having deep grooves enabling them to withstand axial thrust as well as radial loads, may be provided with cages consisting of one single or integral part. According to this invention the cage made out of sheet metal comprises a flat annular ring formed, midway of its width, in each space intervening between adjoining balls, with a narrow central hollow rib or raised circumferential part projecting towards one of the raceways and facing towards and into the deep groove of the said raceway, said ribs corresponding to some degree in its cross-section to the cross-section of the said groove; the cage being provided at the side of the other raceway in a known manner with tongues which extend from each edge of the ring and project inwardly towards the middle of the raceway.

The invention is illustrated in the enclosed drawing which shows by way of example one arrangement according to the invention.

Figure 2:
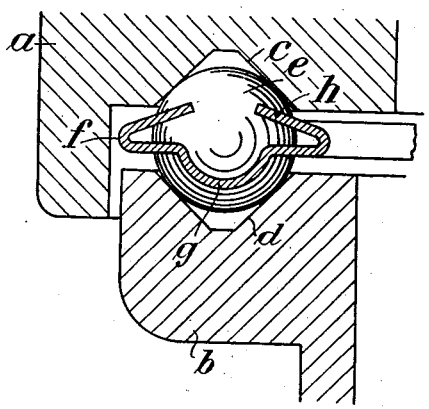
Fig. 2 shows in a larger scale a vertical cross-section according to line II—II in Fig. 1 in which section the raceways with their deep grooves have been outlined as well.
Figure 3:
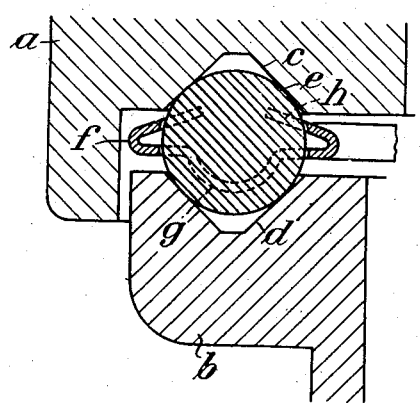
Fig. 3 is a section similar to Fig. 2 but according to line III—III in Fig. 1, viz, through the diametrical plane of a ball.

By $a$ and $b$, Figs. 2 and 3, the raceways of a thrust ball bearing or so-called "longitudinal bearing" with deep grooves have been indicated, the deep grooves being shown at $c$ and $d$ respectively. A set of balls $e$ cooperating with these grooves is held at suitable distances apart by a cage $f$ made out of sheet metal and being formed in one single and integral piece by pressing and bending operations in a manner as usually applied in this branch of the art.

The cage $f$ especially consists of a flat annular ring coinciding with or lying in close proximity of a common plane passing through the centers of the balls, said ring having, midway of its width, a series of circumferentially spaced openings $f'$ within which are housed the balls $e$. This flat ring is formed, midway of its width, in each space intervening between adjoining balls, with a segmental circumferential rib $g$ which projects from the plane of the flat annular part towards one raceway, for instance toward the raceway $d$. This rib may be, as shown, of arcuate cross-section. However, said ribs may be shaped in some other way so as to substantially correspond to the shape of the deep groove $d$ without, however, getting into frictional touch with it.

Figure 1:
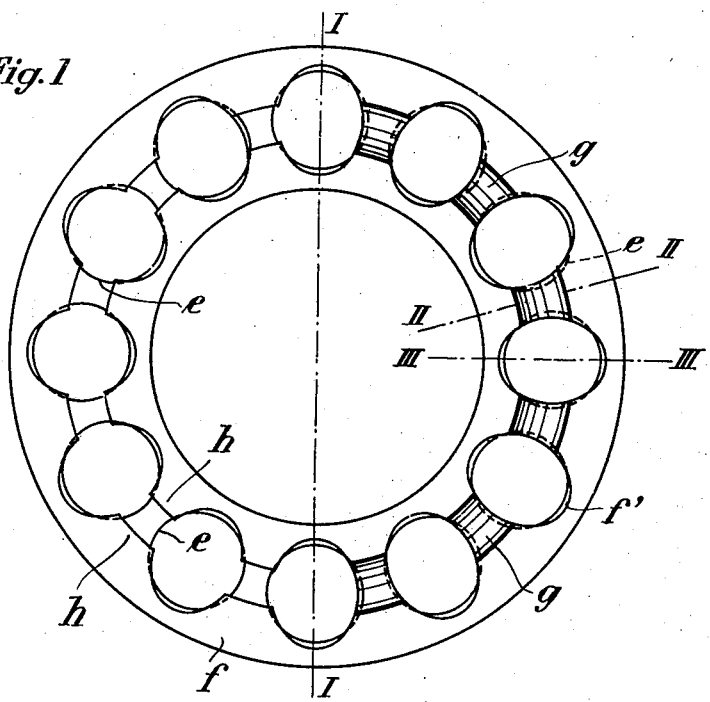
Fig. 1 shows at the left side of the vertical line I—I a plan view of a ball cage seen in the direction of the axis of the thrust bearing from the side of the tongues, whereas at the right side of the figure there is a plan view seen from the side of the hollow annular rib.

The ribs extend to the underside of the balls, so that the openings $f'$ (right side of Fig. 1) while allowing the balls $e$ to cooperate with the raceway $d$ they prevent the balls from escaping through them.

At the side opposite the rib $g$, the cage $f$ is provided with pairs of tongues $h$ in a manner in itself known said tongues being so shaped that they cooperate with the balls as well and retain them in their position within the cage.

As the points of the cage which support the ball are spaced a relatively considerable distance from the common plane passing through the centers of the balls, it is possible to set the balls relatively close to one another without materially weakening the connecting bridges formed by the groove parts $g$ between the openings $f'$.

It is obvious that the arrangement described permits of reducing to a minimum the distance between the raceways, and consequently providing said raceways with relatively deep grooves, while at the same time properly guiding and supporting the balls by securely retaining them in position by means contacting their surface at points relatively remote from their common central plane parallel to the raceways.

Having now particularly described and ascertained the nature of the said invention and in what manner the same is to be performed, we declare that what we claim is:

1. A one piece sheet metal ball cage adapted for use in connection with a thrust ball bearing having two relatively deeply grooved raceways facing and axially spaced a relatively short distance from each other, the diameter of the central circumference of the groove in one raceway corresponding to the diameter of the central circumference of the groove in the other raceway, said ball cage comprising a ring member having circumferentially spaced openings for receiving the balls, the portions of said ring intervening between adjoining openings projecting towards one of the raceways and into the groove thereof, the edge portions of said ring being bent inwardly at an angle towards the balls at the side opposite said intervening ring portions, said edge portions forming tongues extending between adjoining balls.

2. A one piece sheet metal ball cage adapted for use in connection with a thrust ball bearing having two relatively deeply grooved raceways facing and axially spaced a relatively short distance from each other, the diameter of the central circumference of the groove in one raceway corresponding to the diameter of the central circumference of the groove in the other raceway, said ball cage comprising a ring member having circumferentially spaced openings for receiving the balls, the portions of said ring intervening between adjoining openings projecting towards one of the raceways and into the groove thereof, the edge portions of said ring being bent inwardly at an angle towards the balls at the side opposite said intervening ring portions, said edge portions forming tongues extending between adjoining balls and within the groove of the other raceway.

3. A one piece sheet metal ball cage adapted for use in connection with a thrust ball bearing having two relatively deeply grooved raceways facing and axially spaced a relatively short distance from each other, the diameter of the central circumference of the groove in one raceway corresponding to the diameter of the central circumference of the groove in the other raceway, said ball cage comprising a substantially flat ring member having circumferentially spaced openings for receiving the balls, the portions of said ring intervening between adjoining openings being embossed to form segmental rib members circumferentially extending to contact the rounded surface of the balls and projecting towards one of the raceways and into the groove thereof, the edge portions of said ring being bent inwardly at an angle towards the balls at the side opposite said intervening ring portions, said edge portions forming tongues extending between adjoining balls and within the groove of the other raceway.

4. The combination of a thrust ball bearing having two relatively deeply grooved raceways facing and axially spaced a relatively short distance from each other, the diameter of the central circumference of the groove in one raceway corresponding to the diameter of the other raceway, and a one piece sheet metal ball cage for retaining and separating the balls, said ball cage comprising a ring member having circumferentially spaced openings for receiving the balls, the portions of said ring intervening between adjoining openings projecting towards one of the raceways and into the groove thereof, the edge portions of said ring being bent inwardly at an angle towards the balls at the side opposite said intervening ring portions, said edge portions forming tongues extending between adjoining balls.

5. The combination of a thrust ball bearing having two relatively deeply grooved raceways facing and axially spaced a relatively short distance from each other, the diameter of the central circumference of the groove in one raceway corresponding to the diameter of the other raceway, and a one piece sheet metal ball cage for retaining and separating the balls, said ball cage comprising a ring member having circumferentially spaced openings for receiving the balls, the portions of said ring intervening between adjoining openings projecting towards one of the raceways and into the groove thereof, the edge portions of said ring being bent inwardly at an angle towards the balls at the side opposite said intervening ring portions, said edge portions forming tongues extending between adjoining balls and into the groove of the other raceway.

6. The combination of a thrust ball bearing having two relatively deeply grooved raceways facing and axially spaced a relatively short distance from each other, the diameter of the central circumference of the groove in one raceway corresponding to the diameter of the other raceway, and a one piece sheet metal ball cage for retaining and separating the balls, said ball cage comprising a substantially flat ring member having circumferentially spaced openings for receiving the balls, the portions of said ring intervening between adjoining openings being embossed to form segmental rib members circumferentially extending to contact the rounded surface of the balls and projecting towards one of the raceways and into the groove thereof, the edge portions of said ring being bent inwardly at an angle towards the balls at the side opposite said intervening ring portions, said edge portions forming tongues extending between adjoining balls and within the groove of the other raceway.

GEORG SCHILDGEN.
GEORG WEHR.